United States Patent [19]

DeFino et al.

[11] Patent Number: 4,737,763
[45] Date of Patent: Apr. 12, 1988

[54] TRAILER THEFT AND BURGLARY ALARM SYSTEM

[75] Inventors: John M. DeFino, Roanoke; Neal G. Shields, Fort Worth, both of Tex.

[73] Assignee: Specific Cruise Systems, Inc., Fort Worth, Tex.

[21] Appl. No.: 42,731

[22] Filed: Apr. 27, 1987

[51] Int. Cl.$^4$ .............................................. B60R 25/00
[52] U.S. Cl. .................... 340/63; 340/52 R; 340/641; 340/687; 307/10 AT; 307/10 LS
[58] Field of Search ................ 340/63, 635, 641, 642, 340/686, 687, 52 R; 307/10 R, 10 AT, 10 LS

[56] References Cited

U.S. PATENT DOCUMENTS

| | | | |
|---|---|---|---|
| 3,671,934 | 6/1972 | Teich | 340/63 |
| 4,037,194 | 7/1977 | Boyden et al. | 340/63 |
| 4,127,855 | 11/1978 | Toner | 340/687 |
| 4,430,637 | 2/1984 | Koch-Ducker et al. | 340/52 R |

Primary Examiner—Donnie L. Crosland
Attorney, Agent, or Firm—James E. Bradley

[57] ABSTRACT

A trailer theft and burglary alarm system utilizes the releasable electrical connection between a vehicle light circuit and the trailer brake light circuit to warn the operator that the releasable electrical connection is being tampered with. A signal producing apparatus continuously monitors the resistance of the trailer brake light circuit and produces a signal corresponding thereto. When the vehicle is to be left unattended, the signal is recorded. Thereafter, if the releasable connection is disconnected, the signal produced will differ from the original signal. This difference is recognized and the alarm sounds. Portal sensors can be provided that will produce a change in either the resistance or capacitance sensed by the signal producing apparatus if a portal to the trailer is disturbed. This change in either resistance or capacitance will also alter the signal produced, and trigger the alarm.

7 Claims, 1 Drawing Sheet

4,737,763

TRAILER THEFT AND BURGLARY ALARM SYSTEM

BACKGROUND OF THE INVENTION

1. Field of the Invention

This invention relates generally to trailer theft and burglary alarm systems, and more specifically to a theft alarm apparatus and method that is suitable for use with a trailer that has an electric light circuit that makes an electrical connection to a vehicle light circuit through a releasable connector.

2. Description of the Prior Art

Unattended trailers of all kinds are often the object of thefts and burglaries. Boat trailers, camper trailers, motorcycle trailers, equipment trailers and other kinds of trailers can be disconnected from an unattended vehicle, reconnected to the trailer hitch of another vehicle, and driven away in a matter of minutes.

Locks and chains provide some protection. However, sophisticated thieves employ metal saws and bolt cutters to cut through these security devices.

SUMMARY OF THE INVENTION

The present invention provides a warning alarm when the trailer is disconnected from the vehicle, or when there is an intrusion into the trailer.

This theft alarm system depends upon the releasable electrical connection between a vehicle light circuit and a trailer light circuit. In the preferred embodiment, a variable frequency oscillator provides an electrical signal that corresponds, in part, to the electrical resistance of the trailer brake circuit.

Before the vehicle is left unattended, the alarm is set, and a microprocessor records the frequency produced by a variable frequency oscillator. Thereafter, the recorded frequency is compared continously to the frequency produced by the variable frequency oscillator.

When a thief unfastens the releasable electrical connection between the vehicle and the trailer, the frequency of the electrical signal produced by the variable frequency oscillator changes because the overall electrical resistance changes. The microprocessor detects this frequency change and produces a signal which sounds an alarm.

This invention can also provide a warning of trailer intrusions or burglaries, if trailer doors or windows or other similar portals are equipped with switches. When these switches are tripped, the overall electrical resistance changes, and the frequency of the variable frequency oscillator will also change, prompting the microprocessor to activate the alarm.

DESCRIPTION OF THE PREFERRED EMBODIMENT

Figure 1:
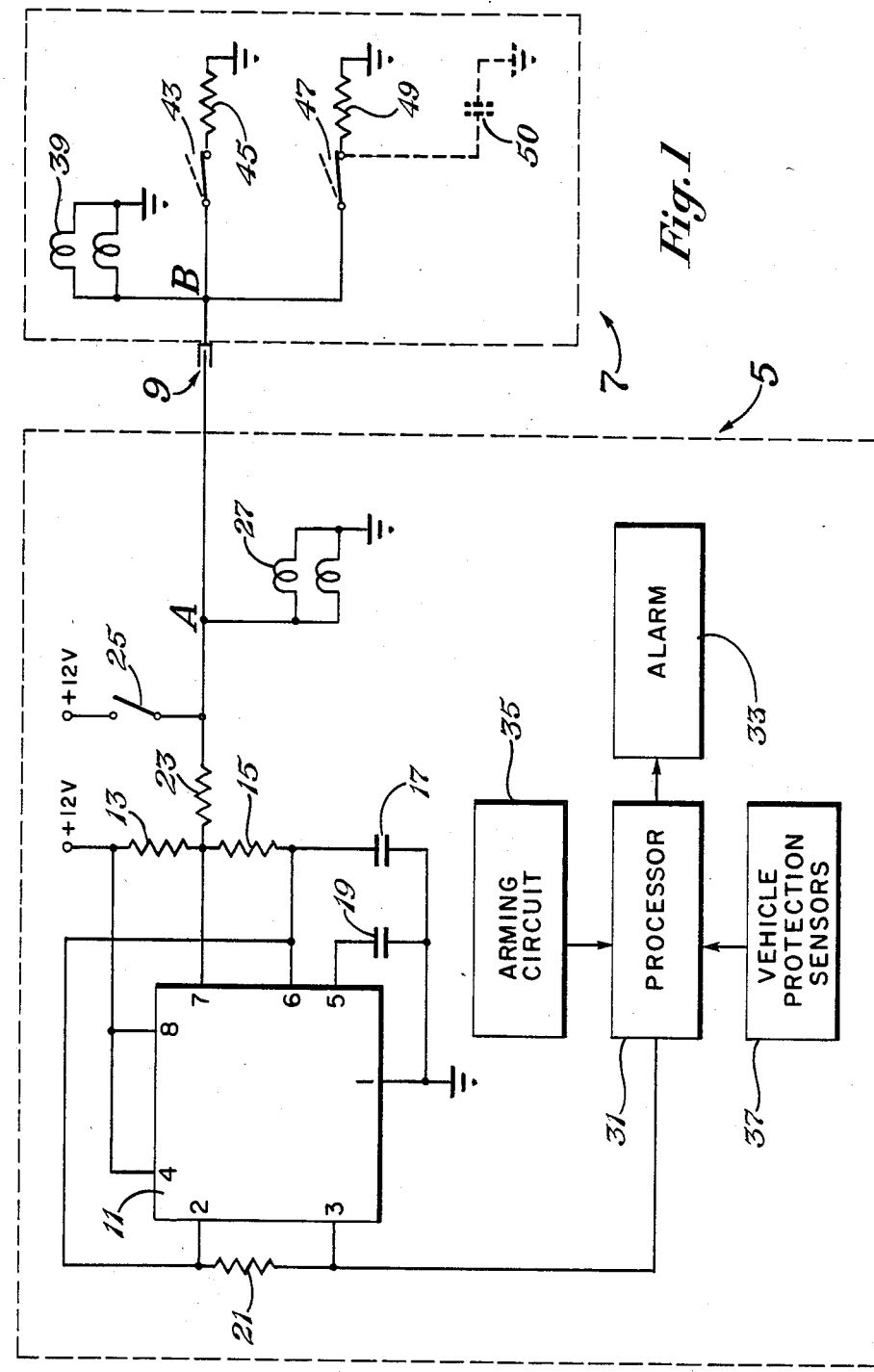
FIG. 1 is a circuit and block diagram of the various components in the vehicle and electrically connected trailer that cooperate together to provide an alarm warning of theft or burglary attempts.

FIG. 1 depicts in block diagram form a vehicle 5 electrically connected to a trailer 7 through a releasable electrical connector 9.

Within the vehicle 5 is located an oscillator 11, which in the preferred embodiment, is an L555 eight pin, astable multivibrator. Pins 4 and 8 are electrically connected together, and also directly connected to a 12 volt power source. Pin 1 is directly connected to ground. Resistor 13 is connected between a 12 volt power source and pin 7. Resistor 15 is connected between pin 6 and pin 7. Capacitor 17 is connected between pin 6 and ground. Capacitor 19 is connected between pin 5 and ground. Resistor 21 is connected between pin 2 and pin 3. Resistor 23 is connected between pin 7 and node A of the brake light circuit.

The conventional vehicle brake light switch 25 is connected between a 12 volt power supply and node A of the brake light circuit. Vehicle brake lights 27 are connected between node A and ground. Node A of the vehicle brake light circuit is electrically connected to node B of the trailer brake light circuit through releasable electrical connector 9.

Output pin 3 of oscillator 11 is electrically connected to a microprocessor 31. Microprocessor 31 is in turn connected to an arming circuit 35, an alarm 33, and various vehicle protection sensors 37. The microprocessor 31 and the components 33, 35 and 37 are standard components of a conventional vehicle burglar alarm system.

Considering now the trailer brake light circuit contained in trailer 7, node B of the trailer brake light circuit is electrically connected to node A of the vehicle brake light circuit through releasable electrical connector 9. Trailer lights 39 are connected between node B and ground. Portal switch 43 is connected between node B and resistor 45. The opposite terminal of resistor 45 is connected to ground. In a similar fashion, portal switch 47 is connected between node B and resistor 49. The other terminal of resistor 49 is connected to ground. The portal switches 43 and 47 are normally closed switches of various conventional types mounted to the doors and windows to cause an alarm if a door or window is opened while the vehicle alarm circuit is armed through arming circuit 35. Instead of resistors for circuit elements 43 and 49, a capacitor 50 may be utilized in conjunction with the portal switches 43, 47.

In operation, the trailer 7 is attached to the vehicle 5 conventionally with a hitch (not shown). The electrical connection 9 is inserted. While the vehicle 5 is moving, if the driver applies the brake, the brake switch 25 will close, causing the vehicle brake lights 27 to light as well as the trailer brake lights 39. There is also a circuit (not shown) that connects through connection 9 for conventionally turning on the trailer tail lights and signal lights (not shown) in unison with the vehicle 5.

When the vehicle 5 and trailer 7 are to be left unattended, the arming circuit 35 activates the vehicle burglar alarm circuit, either actively by the driver or passively depending upon the type of alarm circuit. At that moment, the frequency of the electrical signal continuously produced by oscillator 11 is recorded in the memory of microprocessor 31. This frequency is dependent, in part, upon the electrical resistance of the trailer brake lights 39, and resistors 45 and 49 of the portal switches 43 and 45.

Oscillator 11 is a variable frequency oscillator, which produces an electrical signal at its output, node 3. This electrical signal has a frequency that is dependent upon the cumulative resistance and capacitance sensed by the oscillator 11 at pin 7. The cumulative resistance will, of course, depend upon the various resistance values of resistors 13, 15, 23, and the resistance of the vehicle brake lights 27, the trailer brake lights 39, and the portal switch resistors 43 and 47.

After the arming of the alarm system, the microprocessor continuously monitors the frequency of the electrical signal produced by the oscillator 11. The monitored frequency is constantly compared to the value stored in processor 31 memory. If a thief were to disconnect the trailer brake light circuit from the vehicle brake light circuit at releasable electrical connector 9, then the overall resistance sensed by oscillator 11 would change, and the frequency of the signal produced by oscillator 11 would likewise change. Microprocessor 31 detects such a frequency change by comparing it to the stored value, and provides an electrical signal to alarm 33 which activates the alarm 33.

Should an intruder enter the trailer 7, tripping either portal switch 43 or portal switch 47, the resistance or capacitance sensed by oscillator 11 would change, producing a change in the frequency of the electrical signal produced by oscillator 11. Such change in frequency is detected by microprocessor 31, and the alarm 33 is activated. The alarm 33 is also activated conventionally through processor 31 if any of the vehicle protection sensors 37 indicate an intrusion to the vehicle 5. This portion of the alarm circuit is not affected by the frequency of the oscillator 11.

The oscillator 11 will continuously supply a signal to the microprocessor 31 whether or not the vehicle 5 is operating or whether or not a trailer 7 is attached or the electrical connection 9 made. Once the electrical connection is made, the resistance at pin 7 of oscillator 11 changes. As a result, the frequency of the output signal to the microprocessor 31 will change. Also, depressing the brake pedal to close switch 25 will cause a change in resistance to the input of oscillator 11. Opening or closing the portal switches 43 and 47 output frequency of the oscillator 11. These changes in output frequency will have no effect, however, on the alarm 33 as long as the arming circuit 35 is not activated. The arming circuit 35 will not be activated during driving of the vehicle 5, nor while in the process of connecting the trailer 7 to the vehicle 5.

This trailer alarm system has several very attractive design features. First, once the alarm system is installed in a vehicle, it can be used for the protection of a variety of trailers. The operator does not need to make any adjustments to match the alarm system with a particular resistance of each trailer brake light circuit. This is true because the alarm is sensitive only to changes in frequency from a baseline measurement rather than the numeric value of such frequecny. This also means that no adjustments need be made in this system to accommodate for burned out brake light bulbs.

In addition, there is very little that a thief can do to subvert this system. Cutting the wires at the connection 9 also would cause an alarm because of the change in resistance. If the alarm sounds, reconnecting the releasable electrical connector does not extinguish the alarm.

Third, this alarm system is entirely passive and requires no user interaction. Thus, the operator need only set one alarm to protect both the vehicle and the trailer.

Fourth, this trailer theft protection device is inexpensive and can be integrated into existing microprocessor based automobile alarm systems. Also, other than the optional portal switches, the trailer need not be physically modified for this system to operate.

While the invention has been shown in only one its forms, it should be apparent to those skilled in the art that it is not so limited, but is susceptible to various changes without departing from the scope of the invention.

We claim:

1. A theft alarm device for the protection of a trailer while connected to a vehicle, the trailer being of the type having an electrical lamp circuit, and plug means for releasably connecting the trailer lamp circuit to a vehicle electrical lamp circuit, comprising:

a signal producing means, located in the vehicle having an input connected to the vehicle lamp circuit, for continuously producing at an output an electrical signal corresponding to the resistance monitored at its input, the resistance at the input including the resistance of the trailer lamp circuit when connected to the vehicle lamp circuit;

an alarm arming means, located in the vehicle, for activating the theft alarm device when the vehicle is left unattended;

means, located in the vehicle, for recording the electrical signal at the time the theft alarm device is activated, and for continuously comparing the signal thereafter produced by the signal producing means with the recorded electrical signal; and an alarm means, located in the vehicle, for providing a warning signal while the theft alarm device is activated if the electrical signal produced by the signal producing means differs from the recorded electrical signal, indicating that the trailer lamp circuit is being unplugged from the vehicle lamp circuit.

2. The theft alarm device according to claim 1, wherein the signal producing means comprises a variable frequency oscillator, which produces a variable frequency for the electrical signal corresponding to the resistance at the input of the signal producing means.

3. The theft alarm device according to claim 2, wherein the oscillator is an astable multivibrator.

4. A theft alarm device for a vehicle for warning of tampering with the releasable electrical connection between a vehicle lamp circuit and the lamp circuit of an electrically connected trailer, comprising in combination:

an oscillator means, located in the vehicle, having an input connected to the vehicle lamp circuit, for monitoring the resistance of the vehicle lamp circuit and generating electrical signals with a frequency corresponding in part to the electrical resistance of the trailer lamp circuit when the trailer lamp circuit is connected to the vehicle lamp circuit;

an alarm arming means, located in the vehicle, for activating the theft alarm device when the vehicle and trailer are to be left unattended;

an alarm means, located in the vehicle, for producing a warning signal;

a processor means, located in the vehicle, for sensing and recording the frequency of the electrical signal produced by the oscillator means at the time of arming, for continuously comparing the recorded frequency with the frequency of the electrical signals thereafter generated by the oscillator means, and for activating the alarm means when a significant difference in frequency is detected; and a vehicle protection sensor means for detecting intrusion or tampering with the vehicle, and for providing electrical signals to the processor means indicative of intrusion or tampering.

5. The theft alarm device according to claim 4, further comprising:
   at least one portal sensor means connected to the trailer lamp circuit, for providing a change in resistance in the trailer lamp circuit if a portal on the trailer is opened, causing the oscillator means to sense a change in resistance and the processor means to activate the alarm.

6. The theft alarm device according to claim 4, further comprising:
   at least one portal sensor means connected to the trailer lamp circuit for providing a change in capacitance in the trailer lamp circuit if a portal on the trailer is opened, causing the oscillator means to sense a change in capacitance and the processor means to activate the alarm.

7. A method for protecting a trailer from theft, the trailer being of the type having a lamp circuit electrically connected to a vehicle lamp circuit by a releasable electrical connector, and being hitched to a vehicle having a theft alarm system with an alarm, the method comprising the steps of:
   connecting an oscillator means input to the vehicle lamp circuit and generating electrical signals with a frequency corresponding to the electrical resistance monitored at the input, the electric resistance including the trailer lamp circuit resistance;
   arming the theft alarm system when leaving the vehicle unattended with the trailer connected;
   sensing the frequency of the electrical signals at the moment of arming;
   recording the frequency of the electrical signals sensed at the moment of arming;
   continuously monitoring the frequency of the electrical signals;
   comparing the frequency of the electrical signals with the recorded frequency; and
   activating the alarm when the monitored frequency is significantly different from the recorded frequency, indicating that the trailer lamp circuit is being disconnected from the vehicle lamp circuit.

* * * * *